United States Patent [19]

Fujishima

[11] 4,435,618
[45] Mar. 6, 1984

[54] ADJACENT STATION INTERFERENCE REJECTING CIRCUIT

[75] Inventor: Masakazu Fujishima, Hamamatsu, Japan

[73] Assignee: Nippon Gakki Seizo Kabushiki Kaisha, Shizuoka, Japan

[21] Appl. No.: 341,080

[22] Filed: Jan. 20, 1982

[30] Foreign Application Priority Data

Jan. 28, 1981 [JP] Japan .................................. 56-11142

[51] Int. Cl.$^3$ ............................................. H04H 5/00
[52] U.S. Cl. ........................................ 381/7; 455/144;
455/296; 455/302; 381/94
[58] Field of Search ................. 179/1 GN, 1 GS, 1 P,
179/1 GE; 455/141, 142, 144, 213, 296–307

[56] References Cited

U.S. PATENT DOCUMENTS

| 3,995,219 | 11/1976 | Rasehorn et al. ................ 455/298 X |
| 4,047,116 | 9/1977 | Ogita ..................................... 329/124 |
| 4,069,398 | 1/1978 | Fujie ............................... 179/1 GE |
| 4,192,970 | 3/1980 | Kahn ................................. 455/307 X |

FOREIGN PATENT DOCUMENTS 886481  1/1962  United Kingdom ................ 455/144

Primary Examiner—R. J. Hickey
Attorney, Agent, or Firm—Oblon, Fisher, Spivak, McClelland & Maier

[57] ABSTRACT

A circuit for eliminating a beat signal resulting from interference between a broadcast signal of a received station and a broadcast signal of an adjacent station during the reception of an AM broadcast. A cancel signal generating circuit for forming a cancel signal synchronized to the beat signal contained in an AM detected output signal is connected to the output of an AM detector. The cancel signal is combined with the AM detected output signal in a mixing circuit connected to the AM detector, to eliminate the beat signal. Such a beat signal cancelling circuit may be served by a pilot signal cancelling circuit in an FM receiver.

6 Claims, 1 Drawing Figure

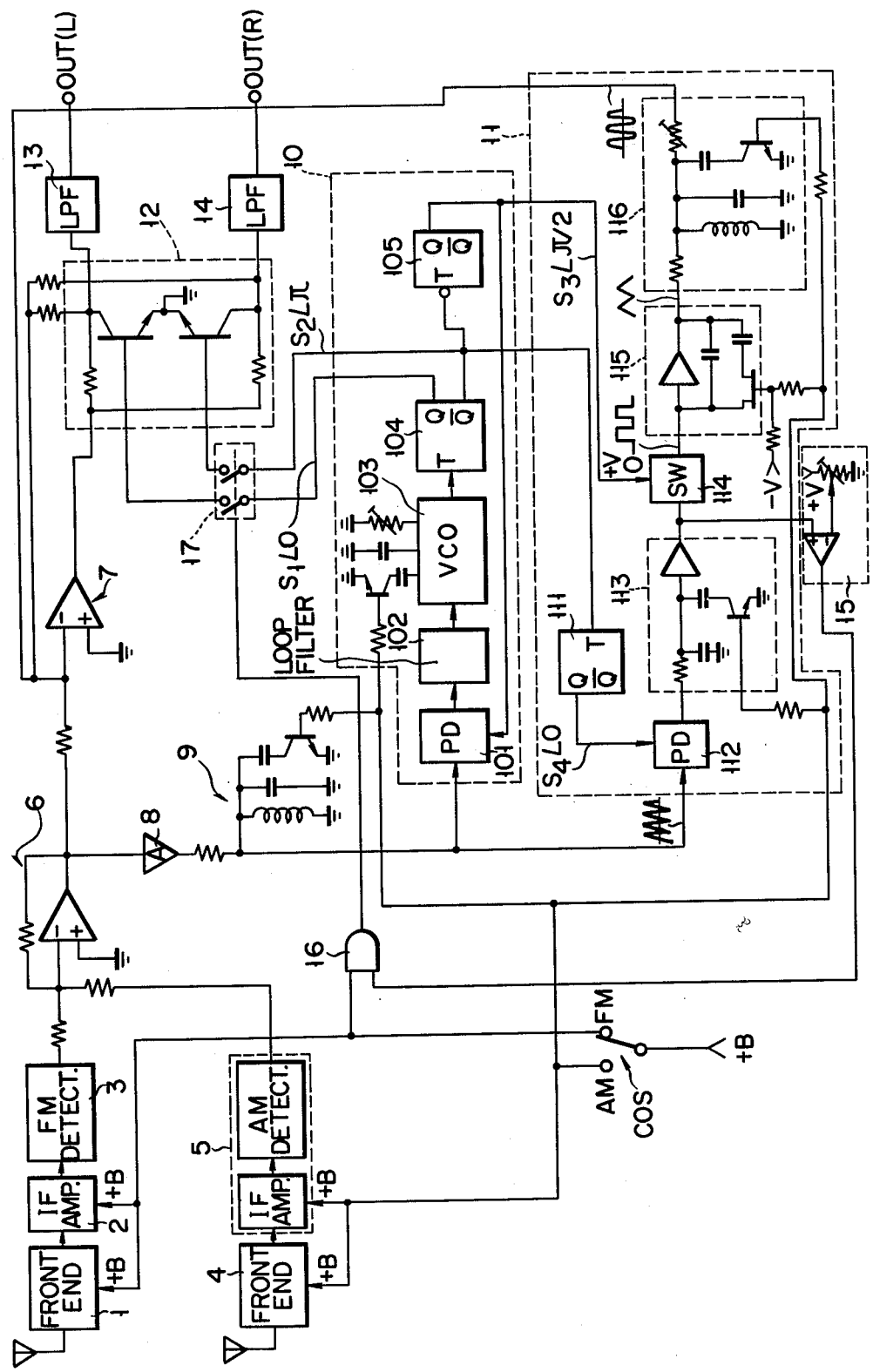

ADJACENT STATION INTERFERENCE REJECTING CIRCUIT

BACKGROUND OF THE INVENTION

This invention relates to an adjacent station interference rejecting circuit of a radio receiver.

In Japan, AM broadcast stations exist at the frequency spacing of 9 kHz. Therefore, when an interference between broadcast stations occurs in a radio receiver, beat signals whose frequencies are integral multiples of 9 kHz are produced. Of these beat signals, the 9-kHz beat signal actually interfers with the reception. Accordingly, it has been in practice to provide a lowpass filter or a band elimination filter in an audio circuit to remove the interfering beat signal.

However, where such a band attenuation system is used, part of audio signals is attenuated together with the 9-kHz beat signal.

SUMMARY OF THE INVENTION

An object of the invention is to provide an adjacent station interference rejecting circuit, which can reliably eliminate only the beat signal resulting from interference between a signal of a received station and a signal of an adjacent station.

Another object of the invention is to provide an FM/AM radio receiver, in which a pilot signal eliminating circuit is also used as a circuit for eliminating the beat signal resulting from interference between a receiving AM station signal and an adjacent AM station signal.

According to the invention, a cancel signal generating circuit for generating a cancel signal synchronized to a beat signal resulting from the interference between a receiving station signal and an adjacent station signal and contained in an AM detected output signal is connected to the output of an AM detector, and the cancel signal is combined in a mixing circuit with the AM detected signal, whereby only the beat signal is eliminated from the AM detected output signal.

BRIEF DESCRIPTION OF THE DRAWING

The drawing shows one embodiment of the FM/AM radio receiver according to the invention.

DETAILED DESCRIPTION OF THE PREFERRED EMBODIMENT

An FM detected output signal which is obtained through an FM front-end circuit 1, an IF amplifier 2 and an FM detector 3, and an AM detected output signal which is obtained through an AM front-end circuit 4 and an IF amplifier/detector 5, are fed to a common amplifier 6. The FM front-end circuit 1 and IF amplifier 2 are enabled when a band selection switch COS is switched to the FM side, while the AM front-end circuit 4 and IF amplifier/detector 5 are enabled when the switch COS is switched to the AM side.

The output signal from amplifier 6 is fed to an adder 7 and also fed through an amplifier 8 to a bandpass filter 9. Bandpass filter 9 is arranged such that its pass band is switched. More particularly, when the band selection switch COS is on the FM side, bandpass filter 9 passes 19 kHz, the frequency of a pilot signal contained in an FM stereo composite signal, while with switch COS set to the AM side it passes a 9-kHz beat frequency.

The output signal of bandpass filter 9 is fed to a phase-locked loop circuit (hereinafter referred to as PLL circuit) 10 and also to a cancel signal forming circuit 11. The PLL circuit 10 is arranged to generate three signals $S_1$ to $S_3$ which are synchronized to the output signal of bandpass filter 9. The frequencies of signals $S_1$ to $S_3$ are simultaneously changed by the band selection switch COS.

PLL circuit 10 includes a phase detector 101, a loop filter 102, a voltage-controlled oscillator (hereinafter referred to as VCO) 103 and T flip-flops (hereinafter referred to as T-FF) 104 and 105. The oscillation frequency of VCO 103 in the locked state of the PLL circuit is set to 76 kHz, which is double the subcarrier frequency in FM stereo composite signal, when band selection switch COS is in the FM position, while it is set to 36 kHz, which is four times the beat frequency, when switch COS is in the AM position. Thus, when switch COS is in the FM position, $S_1$ is expressed as 38 kHz ($<0$), $S_2$ as 38 kHz ($<\pi$) and $S_3$ as 19 kHz ($<\pi/2$). On the other hand, when switch COS is in the AM position $S_1$ is expressed as 18 kHz ($<0$), $S_2$ as 18 kHz ($<\pi$) and $S_3$ as 9 kHz ($<\pi/2$).

Cancel signal forming circuit 11 includes a T-FF 111, a phase detector 112, a lowpass filter 113, a switch circuit 114, an integrating circuit 115 and a resonant circuit 116. T-FF 111 divides the frequency of signal $S_2$ from PLL circuit 10 by a factor of 2 to form a signal $S_4$ which has the same frequency as signal $S_3$ but lags behind in phase from signal $S_3$ by $\pi/2$ (i.e., a signal in the same phase and at the same frequency as the output signal of bandpass filter 9). The output signal of bandpass filter 9 is phase detected in phase detector 112 by signal $S_4$, and an output signal of phase detector 112 is smoothed by lowpass filter 113. The output signal of lowpass filter 113 is switched in switch circuit 114 by signal $S_3$ to form a rectangular signal. The output signal of switch circuit 114 is integrated by integrating circuit 115 to form a triangular signal. The output signal of integrating circuit 115 is supplied to resonant circuit 116, which takes out a fundamental sinusoidal signal of the triangular signal.

Lowpass filter 113, integrating circuit 115 and resonant circuit 116 are arranged such that the time constants thereof are changed by band selection switch COS.

More particularly, when band selection switch COS is on the FM side, resonant circuit 116 provides a 19-kHz sinusoidal signal which has the same amplitude as and is 180 degrees out of phase with the 19-kHz pilot signal contained in the output signal of amplifier 6. On the other hand, when switch COS is on the AM side, resonant circuit 116 provides a 9-kHz sinusoidal signal which has the same amplitude as and is 180 degrees out of phase with the 9-kHz beat signal present in the output signal of amplifier 6.

The sinusoidal signal provided from resonant circuit 116 is supplied as a cancel signal $S_{CSL}$ to adder 7. Thus, when an FM stereo broadcast is being received, a signal which is accurately free from only the 19-kHz pilot signal is provided from adder 7, while in the case of AM broadcast reception an output signal which is accurately free from only the 9-kHz beat signal is obtained.

The output signal of adder 7 is fed to a switching-type FM stereo demodulator 12 having their outputs coupled through de-emphasis/lowpass filters 13 and 14 to left and right channel output terminals OUT(L) and OUT(R).

The demodulator 12 performs the switching stereo demodulating operation when band selection switch COS is on the FM side and also the level of the 19-kHz pilot signal is above a predetermined value. Thus, an output voltage of lowpass filter 113 of cancel signal forming circuit 11 is compared with a reference voltage in a voltage comparator 15, and an output voltage of an AND gate 16 goes high when the output voltage of lowpass filter 113 exceeds the reference voltage. As a result, switch circuit 17 is enabled to supply complementary 38-kHz switching signals from PLL circuit 10 to demodulator 12 so as to perform the switching stereo demodulating operation.

With the 2-band receiver having the construction described above, a cancel signal, which is synchronized to, 180 degrees out of phase with and has the same amplitude as a beat signal in an AM detected signal is formed through bandpass filter 9, PLL circuit 10 and cancel signal forming circuit 11 and is added in adder 7 to the AM detected output signal from amplifier 6 so that only the beat signal can be accurately eliminated from the AM detected output signal.

Further, according to the above embodiment of the invention, bandpass filter 9, PLL circuit 10 and cancel signal forming circuit 11, which are ordinarily used in an FM stereo receiver, are used to form a cancel signal for a 9-kHz beat signal during the reception of AM broadcast signal, therefore, a beat signal eliminating circuit can be provided at low cost.

The cancel signal forming circuit that is illustrated and described above is by no means limitative, and it is possible to use various conventional 19-kHz pilot signal cancel circuits as well, for example U.S. Pat. No. 4,047,116.

What is claimed is:

1. An adjacent station interference rejecting circuit of a receiver comprising:
   a cancel signal forming circuit coupled to an AM detector and, responsive to a beat signal resulting from interference between a receiving station signal and an adjacent station signal and contained in an AM detected signal to produce a cancel signal which is synchronized with the beat signal; and
   a mixing circuit connected to receive the AM detected signal of said AM detector and the cancel signal to combine the detected output signal and the cancel signal to remove the beat signal contained in the AM detected signal.

2. An FM/AM radio receiver comprising:
   reception band switching means for switching the reception band of said radio receiver between FM and AM bands;
   FM receiving circuit means which is enabled to demodulate an FM broadcast signal when said reception band switching means is switched to the FM band;
   AM receiving circuit means which is enabled to demodulate an AM broadcast signal when said reception band switching means is switched to the AM band;
   first circuit means coupled to outputs of said FM receiving circuit means and AM receiving circuit means for passing a pilot signal contained in a detected output signal of said FM receiving circuit means when said reception band switching means is switched to the FM band and passing a beat signal resulting from interference between a receiving station signal and an adjacent station signal when said reception band switching means is switched to the AM band;
   PLL circuit means coupled to the output of said first circuit means and including a voltage-controlled oscillator having its free running frequency selected under the control of said reception band switching means;
   cancel signal forming circuit means coupled to the output of said first circuit means and responsive to output signals from said PLL circuit means to form, when receiving an FM stereo broadcast signal, a pilot signal cancellation signal having a frequency, a phase and an amplitude necessary for calcelling a pilot signal contained in an FM detected output signal from said FM receiving circuit means and produce, when receiving an AM broadcast signal, a beat signal cancellation signal having a frequency, a phase and an amplitude necessary for cancelling the beat signal contained in an AM detected output signal of said AM receiving circuit means;
   a mixing circuit coupled to said AM receiving circuit means, FM receiving circuit means and cancel signal forming circuit, for combining, when receiving the FM stereo broadcast signal, the detected output signal of said FM receiving circuit means and an output signal of said cancel signal forming circuit means to cancel the pilot signal contained in the FM detected output signal and combining, when receiving the AM broadcast signal, the detected output signal of said AM receiving circuit means and the output signal from said cancel signal forming circuit means to cancel the beat signal contained in the AM detected output signal.

3. The radio receiver according to claim 2, further comprising a switching-type FM stereo demodulating circuit coupled to the output of said mixing circuit, and means coupled to said reception band switching means and cancel signal forming circuit means, for passing a demodulation switching signal from said PLL circuit means to said FM stereo demodulating circuit when the amplitude of the pilot signal from said first circuit means exceeds a predetermined level during the reception of a FM broadcast signal.

4. The radio receiver according to claim 2, further comprising:
   second circuit means for receiving said FM detected output signal when said reception band switching means is switched to the FM band and receiving said AM detected output signal when said reception band switching means is switched to the AM band, and for applying either one of said detected output signals to said mixing circuit; wherein
   said mixing circuit is coupled to said second circuit means and said cancel signal forming circuit.

5. The radio receiver according to claim 4, wherein said first circuit means comprises a band pass filter circuit, and coupled to the output of said second circuit means and to said PLL circuit means.

6. The radio receiver according to claim 2, wherein said beat signal is a signal of frequency represented by a frequency difference between two adjacent receiving station signals.

* * * * *